(12) United States Patent
Grechanik et al.

(10) Patent No.: US 9,009,649 B2
(45) Date of Patent: Apr. 14, 2015

(54) APPLICATION SEARCH TOOL FOR RAPID PROTOTYPING AND DEVELOPMENT OF NEW APPLICATIONS

(75) Inventors: Mark Grechanik, Chicago, IL (US); Katharina Andrea Probst, Dyer, IN (US); Kevin Michael Conroy, Rockville, MD (US)

(73) Assignee: Accenture Global Services Limited, Dublin (IE)

( * ) Notice: Subject to any disclaimer, the term of this patent is extended or adjusted under 35 U.S.C. 154(b) by 1828 days.

(21) Appl. No.: 11/804,030

(22) Filed: May 16, 2007

(65) Prior Publication Data

US 2008/0288965 A1 Nov. 20, 2008

(51) Int. Cl.
*G06F 9/44* (2006.01)
*G06F 17/30* (2006.01)

(52) U.S. Cl.
CPC ............ *G06F 17/30646* (2013.01); *G06F 8/36* (2013.01); *G06F 17/30672* (2013.01)

(58) Field of Classification Search
USPC ........................................................ 717/101
See application file for complete search history.

(56) References Cited

U.S. PATENT DOCUMENTS

| | | | |
|---|---|---|---|
| 6,065,035 A | 5/2000 | Shulman et al. | |
| 7,162,471 B1 * | 1/2007 | Knight et al. | 707/750 |
| 7,472,118 B2 | 12/2008 | Hirst | |
| 7,529,744 B1 | 5/2009 | Srivastava et al. | |
| 7,809,710 B2 * | 10/2010 | Galai et al. | 707/709 |
| 7,890,919 B1 | 2/2011 | Williams | |
| 8,171,022 B2 * | 5/2012 | Johnston | 707/733 |
| 8,688,676 B2 * | 4/2014 | Rush et al. | 707/706 |
| 2002/0170032 A1 * | 11/2002 | Beaven et al. | 717/104 |
| 2003/0014415 A1 | 1/2003 | Weiss et al. | |
| 2003/0056192 A1 | 3/2003 | Burgess | |
| 2004/0031016 A1 | 2/2004 | Vaidyanathan et al. | |
| 2004/0172389 A1 * | 9/2004 | Galai et al. | 707/3 |
| 2004/0172612 A1 * | 9/2004 | Kasravi et al. | 717/101 |
| 2005/0262056 A1 | 11/2005 | Hamzy et al. | |
| 2006/0048093 A1 * | 3/2006 | Jain et al. | 717/104 |
| 2006/0112085 A1 * | 5/2006 | Zijlstra et al. | 707/3 |
| 2006/0218146 A1 * | 9/2006 | Bitan et al. | 707/7 |
| 2006/0230035 A1 * | 10/2006 | Bailey et al. | 707/5 |
| 2007/0050343 A1 | 3/2007 | Siddaramappa et al. | |
| 2007/0239760 A1 * | 10/2007 | Simon | 707/102 |
| 2007/0256054 A1 | 11/2007 | Byrne et al. | |

(Continued)

OTHER PUBLICATIONS

David Shepherd, Zachary P. Fry, Emily Hill, Lori Pollock, and K. Vijay-Shanker. 2007. Using natural language program analysis to locate and understand action-oriented concerns. In Proceedings of the 6th international conference on Aspect-oriented software development (AOSD '07). ACM, New York, NY, USA, 212-224.*

(Continued)

*Primary Examiner* — Matthew Brophy
(74) *Attorney, Agent, or Firm* — Brinks Gilson & Lione

(57) ABSTRACT

A code search tool greatly reduces time, cost, and other resource expenditures associated with implementing a new application. The tool is a search, navigation and visualization tool that accepts high-level processing concepts as inputs to identify, rank, and return the code of relevant existing applications. A software developer may use the relevant applications to rapidly build prototypes, identify requirements, and develop new applications. The tool provides an efficient way to improve the reuse of application logic to realize the high-level processing concepts, and more efficiently deliver proof of concept.

27 Claims, 10 Drawing Sheets

(56) References Cited

U.S. PATENT DOCUMENTS

| | | | |
|---|---|---|---|
| 2007/0261036 A1 | 11/2007 | Drake et al. | |
| 2007/0299825 A1* | 12/2007 | Rush et al. | 707/3 |
| 2008/0072210 A1 | 3/2008 | Rush et al. | |
| 2008/0162400 A1* | 7/2008 | O'Malley | 707/1 |
| 2008/0189264 A1* | 8/2008 | Cochran | 707/5 |
| 2009/0138898 A1 | 5/2009 | Grechanik et al. | |
| 2010/0114743 A1* | 5/2010 | Misraje et al. | 705/35 |

OTHER PUBLICATIONS

Renuka Sindhgatta. 2006. Using an information retrieval system to retrieve source code samples. In Proceedings of the 28th international conference on Software engineering (ICSE '06). ACM, New York, NY, USA, 905-608.*

Tao Xie and Jian Pei. 2006. MAPO: mining API usages from open source repositories. In Proceedings of the 2006 international workshop on Mining software repositories (MSR '06). ACM, New York, NY, USA, 54-57.*

Katsuro Inoue, Reishi Yokomori, Tetsuo Yamamoto, Makoto Matsushita, and Shinji Kusumoto. 2005. Ranking Significance of Software Components Based on Use Relations. IEEE Trans. Softw. Eng. 31, 3 (Mar. 2005), 213-225.*

Scott Henninger. 1996. Supporting the construction and evolution of component repositories. In Proceedings of the 18th international conference on Software engineering (ICSE '96). IEEE Compuer Society, Washington, DC, USA, 279-288.*

Inoue, K., Yokomori, R., Yamamoto, T., Matsushita, M., & Kusumoto, S. (2005). Ranking significance of software components based on use relations. Software Engineering, IEEE Transactions on, 31(3), 213-225.*

Xie, Tao, and Jian Pei. "MAPO: Mining API usages from open source repositories." Proceedings of the 2006 international workshop on Mining software repositories. ACM, 2006.*

Bajracharya, Sushil, et al. "Sourcerer: a search engine for open source code supporting structure-based search." Companion to the 21st ACM SIGPLAN symposium on Object-oriented programming systems, languages, and applications. ACM, 2006.*

Baeza-Yates et al., "Modern Information Retrieval," ACM Press/Addison-Wesley, 1999 pp. 118-137, 449.

Biggerstaff et al., "Program Understanding and the Concept Assignment Problem," Commun. ACM, 37(5):72-82, 1994.

Boehm, B. W., "A Spiral Model of Software Development and Enhancement," IEEE Computer, 21(5):61-72, 1988.

Boehm et al., "Prototyping vs. specifying: A Multi-Project Experiment," ICSE '84, pp. 473-484, Piscataway, NJ, USA, 1984, IEEE Press.

Cubranic et al., "Hipikat: A Project Memory for Software Development," IEEE Trans. Software Eng., 31(6):446-465, 2005.

Furnas et al., "The Vocabulary Problem in Human-System Communication," Commun. ACM, 30(11): 964-971, 1987.

Henninger, S., "Supporting the Construction and Evolution of Component Repositories," ICSE, pp. 279-288, 1996.

Holmes et al., "Using Structured Context to Recommend Source Code Examples," ICSE, pp. 117-125, 2005.

Howison et al., "The Perils and Pitfalls of Mining Sourceforge," MSR, 2004.

Krueger, C.W., "Software Reuse," ACM Comput. Surv., 24(2):131-183, 1992.

Mandelin et al., "Jungloid Mining: Helping to Navigate the API Jungle," PLDI, pp. 48-61, 2005.

Muchnick, Steven S., "Advanced Compiler Design and Implementation," Chapter 9, "Dependence Analysis and Dependence Graphics," Morgan Kaufmann, Hardcover, published Aug. 1997, ISBN 1558603204, pp. 267-291.

Robillard, M. P., "Automatic Generation of Suggestions for Program Investigation," ESEC/SIGSOFT FSE, pp. 11-20, 2005.

Sahavechaphan et al., "XSnippet: Mining for Sample Code," OOPSLA, pp. 413-430, 2006.

Stylos et al., "Mica: A Web-Search Tool for Finding API Components and Examples," IEEE Symposium on Visual Languages and Human-Centric Computing, pp. 195-202, 2006.

Ye et al., "Supporting Reuse by Delivering Task-Relevant and Personalized Information," ICSE, pp. 513-523, 2002.

European Search Report for Application No. 08251724.4-2211/1993036 dated Aug. 25, 2009.

Stylos J. Myers: "Mica: a Web-search tool for finding API components and examples" IEEE Symposium on Visual Languages and Human-Centric Computing IEEE Comput. Soc Los Alamitos, CA, USA, Sep. 2006, p. 8, ISBN 0-7695-2586-5.

Henninger S.: "An Evolutionary Approach to Constructing Effective Software Reuse Repositories" ACM Transactions on Software Engineering and Methodology, Association for Computing Machinery, New York, US, vol. 6, No. 2, Apr. 1, 1997, pp. 111-140 ISSN: 1049-331X Section 5.

Martin P. Robillard Ed—Gall H. (ED) "Automatic Generation of Suggestions for Program Investigation" ESEC/FSE'05 Proc. of the Joint 10th European Software Engineering Conference (ESEC) and the 13th. ACM Sigsoft Symposium on the Foundations of Software Engineering (FSE); 20050101 New York, NY:ACM, US, Jan. 1, 2005, pp. 11-20, ISBN: 978-1-59593-014-9.

Holmes R., Murphy G. C.: "Using Structural context to recommend source code examples" 27th International Conference on Software Engineering (IEEE Cat No. 05CH37673) IEEE Piscataway, NJ, USA, 200, pp. 117-125, XP007909509 ISBN: 1-59593-963-2 Section 4.4.

Mark Grechanik; Kevin M. Conroy; Katharina A. Probst ED—Cathrin Weiss; Rahul Premraj; Thomas Zimmermann; Andreas Zeller: "Finding Relevant Applications for Prototyping" Mining Software Repositories, 2007, ICSE Workshop MSR '07 Fourth International Workshop ON, IEEE, PI, May 19, 2000, pp. 12-12, ISBN: 978-0-7695-2950-9.

"Evaluating Recommended Applications", Grechanik, et al. XP-002578115, RSSE Nov. 10, 2008 Atlanta Georgia, Copyright 2008p. 33-35.

Xie, Xinrong, Denys Poshyvanyk and Andrian Marcus "3D visualization for concept location in source code," Proceedings of the 28th International Conference on Software Engineering, ACM, 2006, pp. 1-4.

Renuka Sindhgatta, "Using an Information retrieval System to Retrieve Source Code Samples," ICSE '06, May 2006, pp. 905-908.

* cited by examiner

APPLICATION SEARCH TOOL FOR RAPID PROTOTYPING AND DEVELOPMENT OF NEW APPLICATIONS

BACKGROUND OF THE INVENTION

1. Technical Field

This disclosure concerns finding existing program logic and reusing it to rapidly build prototypes and develop new applications. In particular, this disclosure relates to a search, navigation and visualization tool that accepts high-level processing concepts as inputs that drive a multi-layered search to identify applications and application programming interface (API) calls for reuse.

2. Background Information

Software professionals widely recognize logic (e.g., source code) reuse as a technique that reduces the time, money, and other costs associated with creating a new application. Software professionals recognize API calls as forms of abstraction for high-level processing concepts, which drives the wide acceptance of API calls as reusable logic. For example, implementing an existing API call that produces a pull-down menu eliminates the need to write all the underlining logic necessary to deliver the functionality of a pull-down menu. However, current logic mining techniques and mining tools fail to retrieve highly relevant software components from application repositories that developers can use to prototype requirements in support of high-level processing concepts. Modern search engines do not ensure that applications identified by the search engines can serve as highly relevant application prototypes (HRAPs). Software professionals consider the mismatch between the high-level processing concepts (e.g., the intent reflected in the descriptions of applications) and low-level implementation details (e.g., API calls and actual run-time behaviour) found in application logic a fundamental technical challenge to identifying highly relevant applications (HRAs). Software professionals intend to author meaningful descriptions of applications, in the course of depositing applications into software repositories. The mismatch between the description of an application and the actual behaviour of the application represents one example of the "vocabulary problem", which states that no single word or phrase best describes a programming concept.

In the spiral model of software development, stakeholders describe high-level processing concepts to development teams, and together the stakeholders and development teams identify requirements in support of the high-level processing concepts. In addition, a development team builds a prototype based on the requirements, and the development team demonstrates the prototype to the stakeholders to receive feedback. Prototypes attempt to approximate the desired high-level processing concepts (e.g., features and capabilities) of the new application stakeholders desire development teams to build. The feedback from stakeholders often leads to changes to the prototype and the original requirements, as stakeholders iteratively refine their vision. In the event the stakeholders make a substantial number of changes to the requirements, the development team often discards the prototype and builds a new prototype, and another iteration of refinements repeats. Building prototypes repeatedly without reusing existing application logic costs organizations a great deal in the form of wasted project resources and time.

Development teams find it cost-effective to identify existing applications that approximate the high-level processing concepts and requirements of new software projects as the basis for prototypes. In the context of prototyping, software development professionals consider such existing applications as HRAs. Many application repositories (e.g., open source repositories and source control management systems maintained by stakeholders internally) contain hundreds of thousands of different existing applications (e.g., potential HRAs). Unfortunately, developers find it difficult to identify applications (e.g., HRAs) ideal for prototyping because of the time and expense involved in searching (e.g., querying) application repositories and source control management systems.

The amount of intellectual effort that a developer must expend to move a software system from one stage of development to another may be considered the "cognitive distance." For example, using current search tools developers expend significant intellectual effort to identify potentially relevant applications and confirm HRAs from potentially relevant applications. Many developers employ search engines that identify exact matches between keywords and the words found in application repositories. The application repositories may include descriptions, application logic comments, program variables names, and variable types of existing applications. Such search engines actually increase the difficulty of identifying HRAs, because of the poor quality of information contained in application repositories, and the inability to reduce the cognitive distance required to identify HRAs, as well as other factors. Additionally, many application repositories include incomplete, misleading and inaccurate descriptions of applications identified in the application repositories. Consequently, even matching keywords with words in the application descriptions found in application repositories does not guarantee that the search engine will identify HRAs.

Effective software reuse techniques (e.g., prototyping using existing applications) reduce the cognitive distance between the initial concept of a system (e.g., high-level processing concepts that expressly and implicitly describe the features and capabilities of a new application), establishing discrete requirements, and the production implementation of the new system. Unfortunately, current search engines lack the ability to reduce the cognitive distance related to identifying HRAs.

For example, an application description may indicate that an application includes an encryption feature when in fact the application uses compression as a crude form of encryption. A developer entering "encryption" (e.g., as a high-level processing concept and specific requirement) as a keyword may waste precious time to review a search engine result containing the incorrectly described application, and ultimately discard the result, because the application fails to meet the encryption requirement. The developer must download the application identified in the search result, locate and examine fragments of the application logic that allegedly implements encryption before determining that the application fails to meet the requirement. The developer may spend scarce project development budget resources and significant amount of time to analyze the application before determining that an application is not relevant. The developer may even observe the runtime behavior of the application to ensure that the behavior matches the high-level processing concepts desired by the stakeholders, and meets the requirements in support of the high-level processing concepts before establishing that the application qualifies as a HRA. Current search engines also lack the ability to assist developers to rapidly identify requirements in support of high-level processing concepts described by stakeholders.

Some search tools return code snippets (e.g., segments of application logic), however, code snippets do not give enough background or context to assist developers to create rapid prototypes, and such search tools require developers to invest significant intellectual effort (e.g., cognitive distance) to understand how to use the code snippets in broader scopes. Other existing approaches and tools retrieve snippets of code based on the context of the application logic that developers work on, but while these approaches and tools improve the productivity of developers, they do not return relevant applications from high-level processing concepts as inputs.

A need has long existed for a system and method that efficiently identifies HRAs usable to rapidly build prototypes and develop new applications.

SUMMARY

The EXEcutable exaMPLes ARchive system (Exemplar) rapidly and efficiently identifies highly relevant applications (HRAs) from large application repositories. Using Exemplar, a developer enters high-level processing concepts (e.g., toolbar, download, smart card) as input (e.g., initial query keywords), and Exemplar uses information retrieval and program analysis techniques to retrieve HRAs that implement the high-level processing concepts. Exemplar may also accept various types of inputs that describe high-level processing concepts (e.g. concept text identifiers, concept visual identifiers, concept audio identifiers, and any other sensory identifier usable to identify high-level processing concepts). Exemplar uses the help pages and help documentation of third-party libraries, software development kits, and other middleware to produce a list of names of API calls that Exemplar in turn uses to expand an initial query ("query expansion") to identify the application logic of HRAs and the API calls included in the HRAs. Exemplar determines the behavior of the application logic and API call logic, and ranks the HRAs and API calls included in the HRAs.

Exemplar uses help documentation or other trusted sources that describe API calls to expand queries. An application provider typically provides the help pages and help documentation for their applications, which developers consider reliable and a trusted source. In particular, developers consider application providers trusted sources for help pages and help documentation of popular and widely used applications written by large development teams, produced under rigorous testing and development best practices, and used by other developers who provide feedback regarding documentation using different forums (e.g., user groups). Developers trust help documentation over the descriptions of applications included in application repositories, because application providers generally produce more verbose and accurate help documentation than the descriptions of applications included in application repositories. Developers also trust help documentation because many different people and review procedures are typically used to produce help documentation.

Exemplar query expansion increases the probability of identifying logic matches usable to build highly relevant application prototypes (HRAPs) and new applications, and addresses the vocabulary problem mentioned above by expanding an initial query to include new keywords, metadata, and semantics information found in help pages and other help documentation determined to have similar meanings to the keywords originally used by a developer in the initial query. Exemplar expands an initial query to include the names of API calls with semantics that reflect (in many cases unequivocally) specific behaviour of the matched applications. Exemplar locates application logic containing the API calls that exhibit desired semantics by identifying API calls through help pages and help documentation. Exemplar provides a user interface that developers can use to navigate directly to the various locations to determine how an HRA implements high-level processing concepts.

Exemplar may rank HRAs according to the number of high-level processing concepts implemented by each API call found in the HRAs, or based on other ranking metrics. In other words, since API calls implement high-level processing concepts, the more high-level processing concepts implemented by an HRA the more relevant the HRA and the higher the rank assigned to the HRA. Exemplar considers keywords included in queries to represent logically connected concepts. Often a question structured as a sentence forms the basis for a query, from which a developer extracts keywords to form the query. For example, consider the query "send receive secure XML." Where a query presents a relation between multiple concepts (e.g., send secure XML), then a relation should exists between API calls that implement the concepts in the corresponding application logic (e.g., API calls that encrypt, process or handle XML formatted content, and transmit content). Application logic often preserves the relations between concepts (e.g., control flow and data flow links), an instance of the software reflection model concept and known as connectivity heuristics. Exemplar calculates HRAs rankings based on analyzing the connectivity heuristics of API calls that implement the concepts included in the queries. Exemplar uses program analysis algorithms, and computes control flow graphs (CFG), and data flow graphs (DFG) to analyze the connectivity heuristics of API calls.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

DETAILED DESCRIPTION

Figure 1:
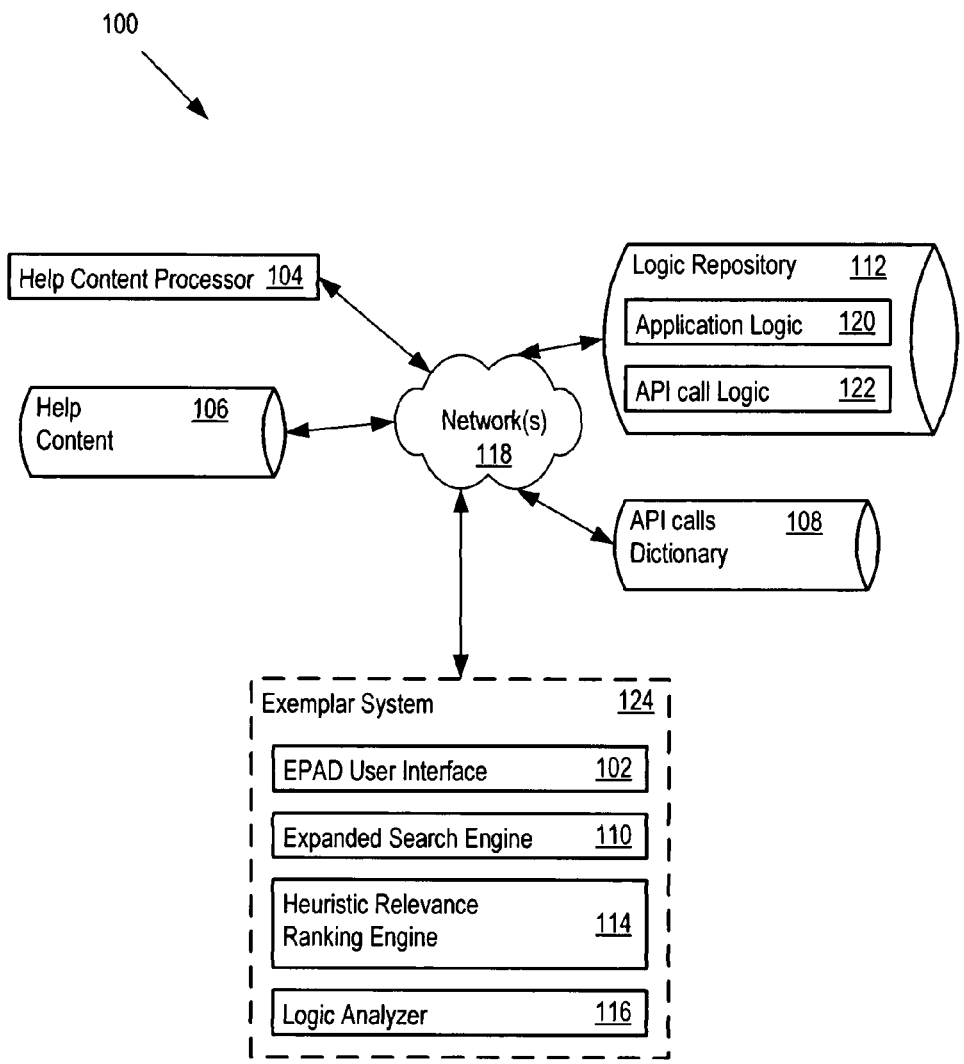
FIG. 1 illustrates the Exemplar system configuration.

The EXEcutable exaMPLes ARchive system (Exemplar) solves the technical problem of providing a tool that accepts high-level processing concepts as queries to identify, determine the behavior, rank and return the application logic of HRAs. Exemplar solves an instance of the difficult vocabulary problem that exists when users and developers describe processing concept with different words. Exemplar is not limited to basic keyword matching used in queries against application descriptions and comments included with application logic. Accordingly, when an application is highly relevant, and where a query contains keywords different from the words used by the developer to describe application logic and API call logic, Exemplar nevertheless returns the application as a highly relevant application.

Exemplar matches high-level processing concepts (e.g., expressed using keywords) with the descriptions of various API calls found in help documents or other trusted descriptive sources. Because a typical application invokes API calls from several different libraries, several different people who use different vocabularies often author help documents associated with API calls. The richness of different vocabularies increases the probability of finding matches and producing a long list of potentially relevant applications and API calls. Searching help documents or other trusted descriptive sources produces additional benefits. For example, help documents including an API call often indicate where the application logic implements the API call. Consequently, Exemplar may direct a developer to the location in application logic where an API call implements a high-level processing concept. The developer may then determine the relevance of the application logic and API call logic. In other words, the developer may determine whether the application logic and API call logic actually support the high-level processing concept.

Although specific components of Exemplar will be described, methods, systems, and articles of manufacture consistent with Exemplar may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Logic that implements the processing and programs described below may be stored (e.g., as computer executable instructions) on a computer readable medium such as an optical or magnetic disk or other memory. Alternatively or additionally, the logic may be realized in an electromagnetic or optical signal that may be transmitted between entities. An example of such a signal is a physical layer Ethernet signal bearing TCP/IP packets that include program source code or executable programs. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Furthermore, the programs, or any portion of the programs, may instead be implemented in hardware.

FIG. 1 illustrates the Exemplar system environment 100 ("Exemplar environment 100). The Exemplar environment 100 may include an Exemplar prototyping and application development (EPAD) user interface 102, a help content processor 104, and help content 106. The Exemplar environment 100 also includes an API calls dictionary 108, expanded search engine 110, logic repository 112, heuristic relevance ranking engine 114, and a logic analyzer 116. Any or all of the elements shown in FIG. 1 may be co-located or distributed and in communication over one or more networks 118 (e.g., the Internet).

In one implementation, the EPAD user interface 102, expanded search engine 110, heuristic relevance ranking engine 114 and logic analyzer 116 form an Exemplar system 124 within the Exemplar environment 100. The Exemplar system 124 may include additional or different components. The Exemplar system 124 may communicate with the help content processor 104, help content 106, API calls dictionary 108, and logic repository 112, as well as other systems, through the networks 118 (e.g., Internet) as external systems.

The logic repository 112 may include application logic 120 and API call logic 122. The Exemplar system 124 accepts high-level processing concepts (e.g., "send secure XML") as input and produces output identifying which application logic 120 and API call logic 122 developers may use to prototype and develop new applications implementing the high-level processing concepts. In one implementation, the Exemplar environment 100 implements the help content 106 and the logic repository 112 with multiple storage devices (e.g., multiple databases on different disk drives), and interfaces to help content 106, application logic 120 and API call logic 122 from various available source (e.g., local or remote help databases, websites, knowledge exchanges, document repositories, or other sources).

In one implementation, the help content processor 104 may be implemented as a web crawler that traverses available application repositories, and downloads help content 106 (e.g., application descriptions), and logic repository 112 content (e.g., application logic 120, and API logic 122). The help content processor 104 may also perform full text indexing on the help content 106 and the logic repository 112 content. The help content processor 104 may further produce an API calls dictionary 108 that includes sets of tuples (a form of ordered list) that link selected words from the descriptions of the API calls to the names of the API calls.

The description above used the examples of application logic 120 and API call logic 122. These types of logic may be program source code (e.g., C or C++ code), for example. However, the Exemplar environment 100 may search, analyze, and determine relevance for many other types of logic. As examples, the logic repository 112 may include programs or program components expressed in a visual programming language using graphical program elements and spatial arrangements of text and graphic symbols. The visual programming logic may include icon-based logic, form-based logic, diagram-based logic or other types of visual expression. The visual expression may be consistent with dataflow languages, flow-based programming, domain-specific modelling, or other programming paradigms.

Figure 2:
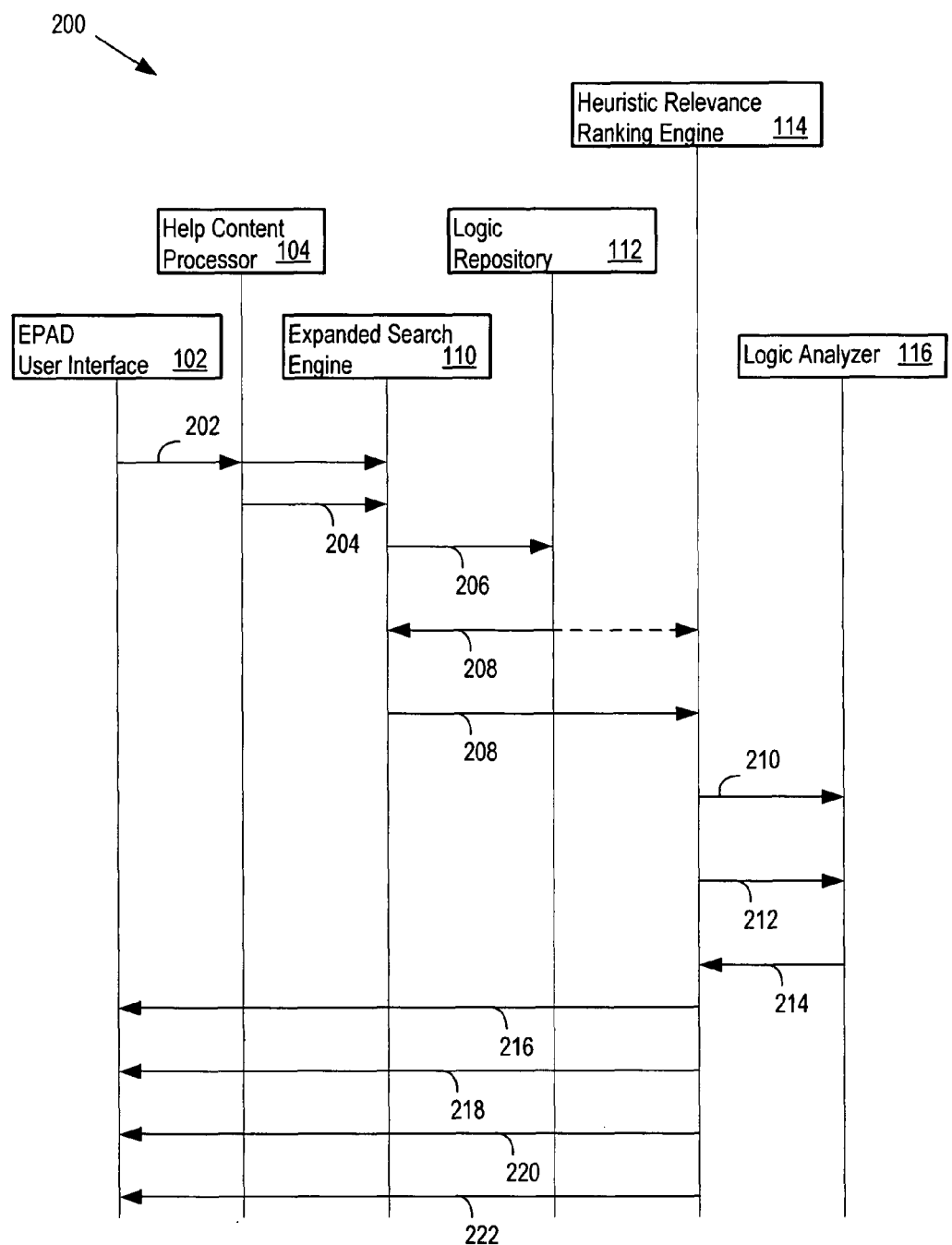
FIG. 2 shows an Exemplar data flow diagram.

FIG. 2 shows an Exemplar data flow diagram 200. Exemplar system 124 accepts a high-level processing concept as input to create an original query 202 that Exemplar system 124 may forward to the help content processor 104. The help content processor 104 may produce a basis API call list 204 from the API calls dictionary 108 by matching the words in the high-level processing concepts (e.g., "send secure XML") found in the original query 202 executed to search the help content 106.

The expanded search engine 110 may combine the original query 202 and the basis API call list 204 to form an expanded query 206. The expanded search engine 110 may execute an expanded search using the expanded query 206 to search through the logic repository 112 to obtain an expanded search result 208. In one implementation, the logic repository 112 may return the expanded search results 208 to the heuristic relevance ranking engine 114. The expanded search result 208 may contain a list of potentially relevant applications 210 and potentially relevant API calls 212 that the heuristic relevance ranking engine 114 analyzes using the logic analyzer 116. In one implementation, the heuristic relevance ranking engine 114 may include the logic analyzer 116. The logic analyzer 116 may include a parser generator such as ANTLR ("ANother Tool for Language Recognition") available from www.antlr.org that provides support for generating data flow graphs and control flow graphs.

The logic analyzer 116 may return connectivity rankings 214, discussed in detail below, to further determine an application heuristic relevance ranking 216 and an API call heuristic relevance ranking 218. The heuristic relevance ranking engine 114 may return the application heuristic relevance ranking 216 and an API call heuristic relevance ranking 218 to the EPAD user interface 102. The expanded search engine 110 may also return a relevant applications list 220 and a relevant API calls list 222 to the EPAD user interface 102. The Exemplar system 124 may assign an application heuristic relevance ranking 216 to one or more relevant applications found in the relevant applications list 220 to indicate how closely each relevant application supports the high-level processing concept represented by the original query 202. Similarly, Exemplar system 124 may assign an API call heuristic relevance ranking 218 to one or more relevant API calls found in the relevant API call list 222 to indicate how closely each relevant API call supports the high-level processing concept represented by the original query 202.

Figure 3:
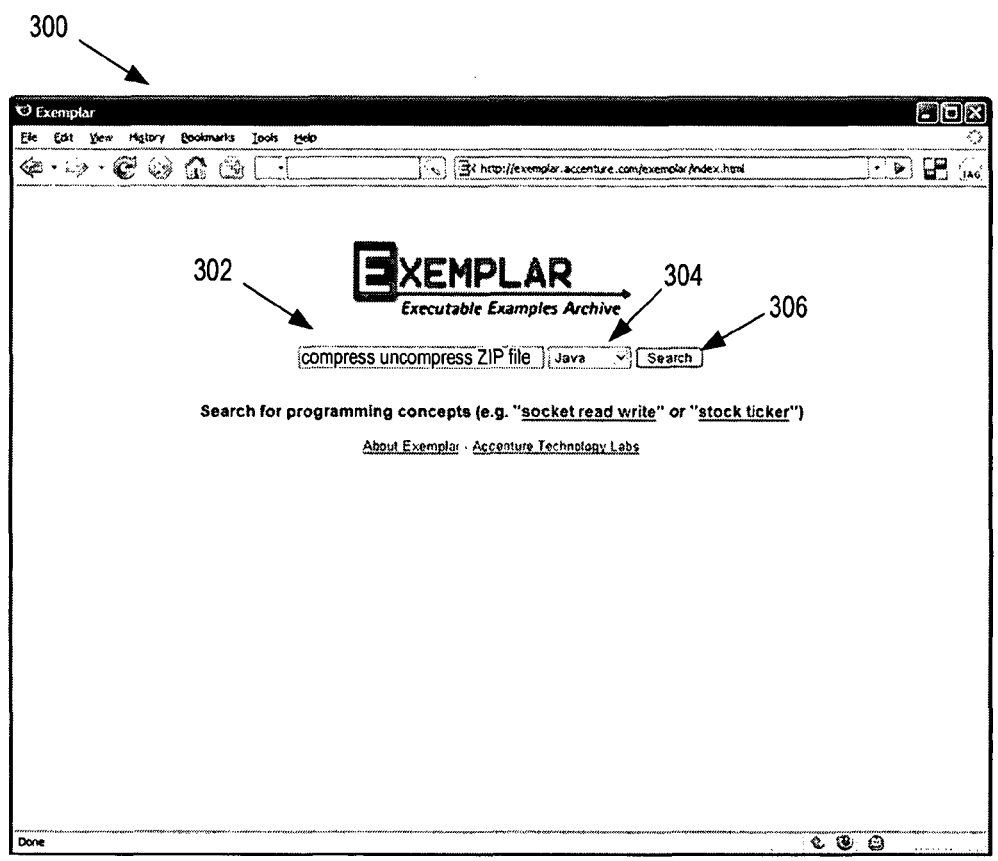
FIG. 3 illustrates an Exemplar query interface that may be used to input an original query.

FIG. 3 illustrates an Exemplar query interface 300 that may be used to input an original query 202. The original query 202 may represent a high-level processing concept such as "compress uncompress ZIP file," as shown in the text entry field 302. Several developers may have implemented the example high-level processing concept "compress uncompress ZIP file" 302 in different ways with various API calls described in the help content 106, API calls dictionary 108 and logic repository 112. A user may specify search refinement criteria 304 using interface elements such as a drop down box, menu or user input field. The search refinement criteria 304 may dictate the types of logic of interest (e.g., C, C++, JAVA, or other types of logic), may dictate the information sources searched (e.g., search only compiled Help files, or *.doc files), or may specify other search criteria. The Exemplar query interface 300 may include graphical user interface elements (e.g., the search button 306) used to execute the original query 202.

Table 1 shows an example of an original query 202 in the form of a structured query language statement (SQL) that represents the high-level processing concept "compress uncompress ZIP file" 302. Table 1 shows that the original query 202 will search the help content 106 (e.g., Java Help Documents) to identify a basis API calls list 204.

TABLE 1 original query 202

SELECT basis API Calls
FROM Java Help Documents
WHERE Words in these Documents =
    compress or uncompress or ZIP or file.

Table 2 shows one example of the help content 106 represented by a fragment of Java Help Documentation released by Sun Microsystems, Inc. that describes the functionality of classes exported from the Java.util package. The Java.util package defines a number of classes, primarily collections classes that a developer may use when working with groups of objects. Referring to Table 2, the help content processor 104 may identify partial matches for the class ZipEntry to the original query 202. The help content processor 104 may search the help content 106 and identify a fragment of the help documentation for the ZipEntry class shown in Table 3.

TABLE 2 help content 106 (e.g. a fragment of Java Help Document)

| Class | Summary |
|---|---|
| Adler32 | A class that can be used to compute the Adler-32 checksum of a data stream. |
| CheckedInputStream | An input stream that also maintains a checksum of the data being read. |
| CheckedOutputStream | An output stream that also maintains a checksum of the data being written. |
| CRC32 | A class that can be used to compute the CRC-32 of a data stream. |
| Deflater | This class provides support for general purpose compression using the popular ZLIB compression library. |
| DeflaterInputStream | Implements an input stream filter for compressing data in the "deflate" compression format. |
| DeflaterOutputStream | This class implements an output stream filter for compressing data in the "deflate" compression format. |
| GZIPInputStream | This class implements a stream filter for reading compressed data in the GZIP file format. |
| GZIPOutputStream | This class implements a stream filter for writing compressed data in the GZIP file format. |
| Inflater | This class provides support for general purpose decompression using the popular ZLIB compression library. |
| InflaterInputStream | This class implements a stream filter for uncompressing data in the "deflate" compression format. |
| InflaterOutputStream | Implements an output stream filter for uncompressing data stored in the "deflate" compression format. |
| ZipEntry | This class is used to represent a ZIP file entry. |
| ZipFile | This class is used to read entries from a zip file. |
| ZipInputStream | This class implements an input stream filter for reading files in the ZIP file format. |
| ZipOutputStream | This class implements an output stream filter for writing files in the ZIP file format. |

Table 3 shows the descriptions of two different methods (e.g., getCompressedSize, and setMethod) for the ZipEntry class that include the terms compress and uncompress found in the high-level processing concept "compress uncompress ZIP file" 302. The basis API call list 204 may include the getCompressedSize and setMethod methods.

TABLE 3 help content 106 (e.g., fragment of help documentation for ZipEntry class)

| Method | Summary |
|---|---|
| Object | clone( ) Returns a copy of this entry. |
| String | getComment( ) Returns the comment string for the entry, or null if none. |
| long | getCompressedSize( ) Returns the size of the compressed entry data, or −1 if not known. |
| long | getCrc( ) Returns the CRC-32 checksum of the uncompressed entry data, or −1 if not known. |
| byte[ ] | getExtra( ) Returns the extra field data for the entry, or null if none. |
| int | getMethod( ) Returns the compression method of the entry, or −1 if not specified. |

TABLE 3-continued help content 106 (e.g., fragment of help documentation for ZipEntry class)

| Method | Summary |
|---|---|
| String | getName( ) |
| | Returns the name of the entry. |
| long | getSize( ) |
| | Returns the uncompressed size of the entry data, or −1 if not known. |
| long | getTime( ) |
| | Returns the modification time of the entry, or −1 if not specified. |
| int | hashCode( ) |
| | Returns the hash code value for this entry. |
| boolean | isDirectory( ) |
| | Returns true if this is a directory entry. |
| void | setComment(String comment) |
| | Sets the optional comment string for the entry. |
| void | setCompressedSize(long csize) |
| | Sets the size of the compressed entry data. |
| void | setCrc(long crc) |
| | Sets the CRC-32 checksum of the uncompressed entry data. |
| void | setExtra(byte[ ] extra) |
| | Sets the optional extra field data for the entry. |
| void | setMethod(int method) |
| | Sets the compression method for the entry. |
| void | setSize(long size) |
| | Sets the uncompressed size of the entry data. |
| void | setTime(long time) |
| | Sets the modification time of the entry. |
| String | toString( ) |
| | Returns a string representation of the ZIP entry. |

Table 4 shows an example of two equivalent forms of an expanded query 206 that expand the original search from the help content 106 (e.g., Java Help Documents) to the logic repository 112 using the basis API call list 204 from the original query 202. Table 4 statement A shows the getCompressedSize and setMethod that may be included in the basis API call list 204. Table 4 statement B shows the expanded query 206 as a nested query, where the original query 202 and the basis API call list 204 (e.g., getCompressedSize and setMethod) drive the outer query that searches the logic repository 112 for potentially relevant applications 210 to obtain the expanded query result 208 including potentially relevant applications 210 and potentially relevant API calls 212. The expanded query 206 may improve upon the original query 202 by targeting the search performed against the logic repository 112 to obtain application logic 120 with a high probability of including potentially relevant applications 210 and potentially relevant API calls 212.

TABLE 4 expanded query 206

```
A.     SELECT Potentially Relevant Applications
       FROM Logic Repository
       WHERE API Calls in
           Source Code Files of these Application
               = getCompressedSize or setMethod.
/******* The SQL statement above also expressed below. **********/
B.     SELECT Potentially Relevant Applications
       FROM Logic Repository
       WHERE API Calls in
           Source Code Files of these Application
               = {
               SELECT basis API Calls
               FROM Java Help Documents
               WHERE Words in these Documents =
                   compress or uncompress or ZIP or file
               }.
```

Table 5 shows another example of two equivalent forms of an expanded query 206 that expand the original search from the help content 106 (e.g., Java Help Documents) to the logic repository 112 by combining the original query 202 and the basis API call list 204 to form the expanded query 206. Table 5 statement A shows the getCompressedSize and setMethod (e.g., the basis API call list 204) combined with the original query 202. Table 5 statement B shows the expanded query 206 as a nested query, where the original query 202 and the basis API call list 204 (e.g., getCompressedSize and setMethod) drive the outer query that searches the logic repository 112 for potentially relevant applications 210 to obtain the expanded query result 208 including potentially relevant applications 210 and potentially relevant API calls 212. The expanded query 206 may improve upon the original query 202 by targeting the search performed against the logic repository 112 to obtain application logic 120 with a high probability of including potentially relevant applications 210 and potentially relevant API calls 212.

TABLE 5 expanded query 206

```
A.     SELECT Potentially Relevant Applications
       FROM Logic Repository
       WHERE API Calls in
           Source Code Files of these Application
               = getCompressedSize or setMethod or
                   compress or uncompress or ZIP or file.
/******* The SQL statement above also expressed below. **********/
B.     SELECT Potentially Relevant Applications
       FROM Logic Repository
       WHERE API Calls in
           Source Code Files of these Application
               = {
               SELECT basis API Calls
               FROM Java Help Documents
               WHERE Words in these Documents =
                   compress or uncompress or ZIP or file
               } or compress or uncompress or ZIP or file.
```

Table 6 shows an example of a fragment of logic extracted from the logic repository 112 (e.g., potentially relevant application 210) that includes a potentially relevant API call 212 (e.g., getCompressedSize).

TABLE 6 potentially relevant application 210 (e.g., extracted logic fragment)

```
public static void addFilesToExistingZip(File zipFile, File[ ] files)
       throws IOException {
    // get a temp file
       File tempFile = File.createTempFile(zipFile.getName( ), null);
    // delete it, otherwise you cannot rename your existing zip to it.
       tempFile.delete( );
       int sz = zipFile.getCompressedSize( );
       boolean renameOk=zipFile.renameTo(tempFile);
       if (!renameOk && sz == −1)
       {
           throw new RuntimeException("could not rename the file
"+zipFile.getAbsolutePath( )+"to "+tempFile.getAbsolutePath( ));
       }
       byte[ ] buf = new byte[1024];
```

Figure 4:
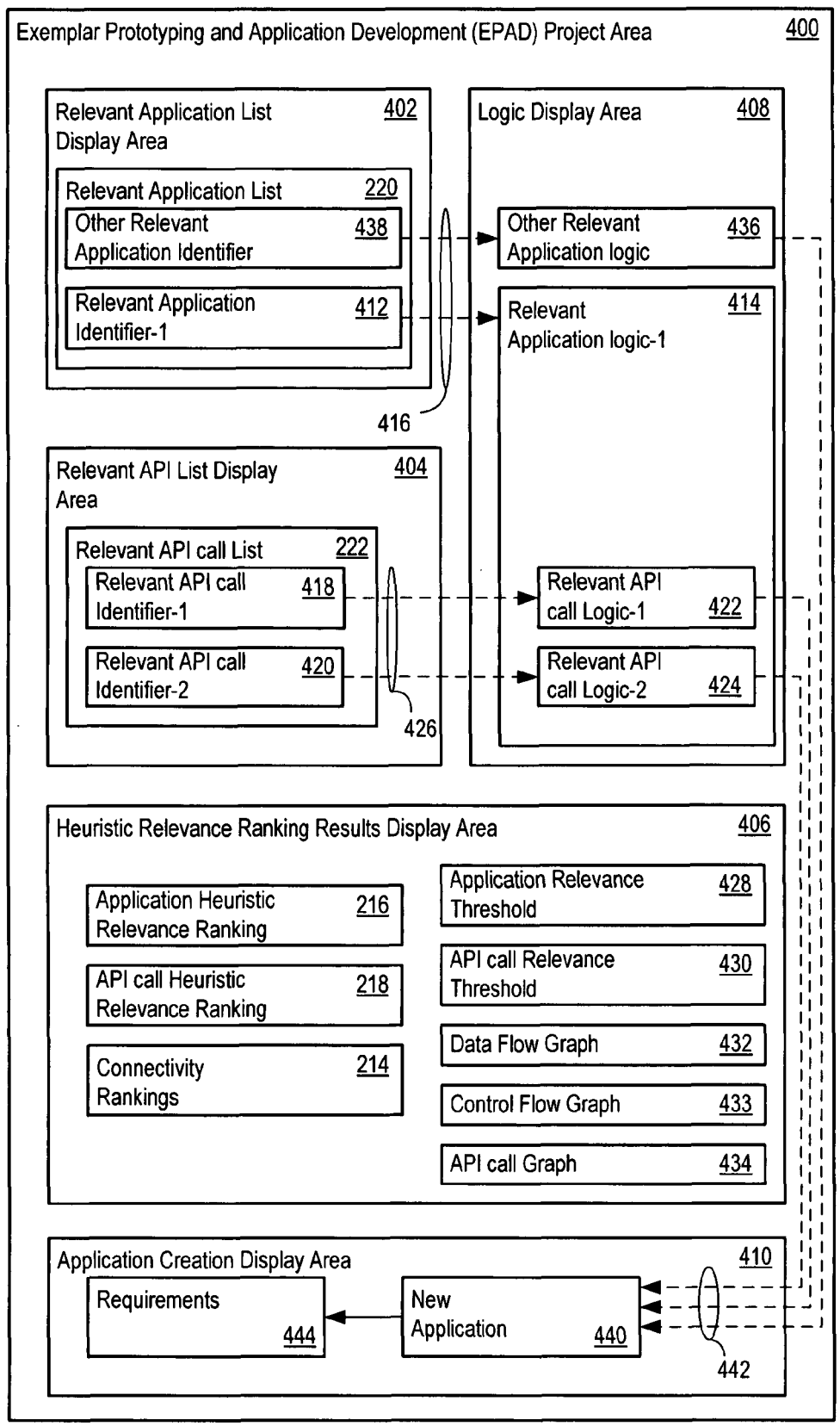
FIG. 4 shows an Exemplar system prototyping and application development (EPAD) project area.

FIG. 4 shows an Exemplar system 124 prototyping and application development (EPAD) project area 400. The EPAD project area 400 may include a relevant application list display area 402, relevant API list display area 404, heuristic relevance ranking results display area 406, logic display area 408, and application creation display area 410. The relevant application list display area 402 may include the relevant application list 220 produced by the Exemplar system 124 based on the expanded query 206 search results. The relevant applications list 220 may include a relevant application identifier-1 412 (e.g., a program name, repository identifier, file name, or other program specifier) of relevant application logic 414. A user may select any identifier, as indicated by the arrow 416, to display the relevant application logic 414 (e.g., source code for the program) in the logic display area 408. The EPAD user interface 102 may include a keyboard, mouse, a microphone (or other sensors), joystick, game pad, or the like for the user to interact with the EPAD project area 400.

The relevant API list display area 404 may include the relevant API call list 222 returned by Exemplar system 124 based on the original query 202. The relevant API call list 222 may include a relevant API call identifier-1 418 (e.g., a function call name) and a relevant API call identifier-2 420 of the relevant API call logic-1 422 (e.g., source code for the function call) and relevant API call logic-2 424, respectively. The EPAD project area 400 may present the relevant API call identifier-1 418 and the relevant API call identifier-2 420 as user selectable, indicated by the arrow 426, to display and highlight the relevant API call logic-1 422 and the relevant API call logic-2 424 in the logic display area 408. In one implementation, the logic display area 408 may highlight the relevant application logic 414, and relevant API call logic-1 422 and relevant API call logic-2 424 so that the user can further determine the relevance of the logic to the high-level processing concept represented in the original query 202.

The heuristic relevance ranking results display area 406, shown in FIG. 4, may include an application relevance threshold 428, an API call relevance threshold 430, data flow graph 432, control flow graph 433, and an API call graph 434. The heuristic relevance ranking results display area 406 may display heuristic relevance ranking engine 114 information to assist the user to determine the relevance of user selected logic. As will be described in more detail below, the heuristic relevance ranking engine 114 may determine the application heuristic relevance ranking 216 for the relevant application logic 414 based on the number of relevant API calls (e.g., relevant API call logic-1 422 and relevant API call logic-2 424) found in the relevant application logic 414 in comparison to other relevant application logic 436 identified by Exemplar system 124. For example, the high-level processing concept example "compress uncompress ZIP file" 302 may be entirely implemented in relevant application logic 414, but only partially implemented in the other relevant application logic 436. As a result, the heuristic relevance ranking engine 114 may assign the relevant application logic 414 a higher application heuristic relevance ranking 216 than the other relevant application logic 436. In another implementation, the heuristic relevance ranking engine 114 may determine the API call heuristic relevance rankings 218 of the relevant API call logic-1 422 and the relevant API call logic-2 424, based on analyzing semantics derived from the expanded query 206 and the expanded search result 208, which establish the behaviour of the relevant API call logic-1 422, the relevant API call logic-2 424, and the relevant applications logic-1 414.

The application relevance threshold 428 and API call relevance threshold 430, shown in FIG. 4, may be user selectable and/or pre-configured with system default values. In another implementation, Exemplar system 124 may determine the application relevance threshold 428 and the relevance threshold 430 based a number of factors (e.g., the complexity of the high-level processing concept represented by the original query 202, and the number of potentially relevant applications 210 and potentially relevant API calls 212 identified by the expanded search result 208). Exemplar system 124 may use the application relevance threshold 428 and the relevance threshold 430 to further refine the relevant applications list 220 and the relevant API calls list 222, respectively. In one implementation, the application relevance threshold 428 and the relevance threshold 428 may determine an application heuristic relevance ranking 216 value that the potentially relevant applications 210 must meet to be included on the relevant applications list 220. The API call relevance threshold 430 may also determine the API call heuristic relevance ranking 218 value that the potentially relevant API calls 212 must meet to be included on the relevant API calls list 222. For example, an application relevance threshold 428 of 1 may indicate a low relevance requirement (e.g., requiring loosely relevant applications, and low application heuristic relevance rankings 216) and allow a large number of potentially relevant applications 210 to qualify as relevant applications (e.g., relevant application logic-1 414). In another example, an application relevance threshold 428 of 10 may indicate a high relevance requirement (e.g., requiring highly relevant applications, and high application heuristic relevance rankings 216) and allow only a fewer number of potentially relevant applications 210 to qualify as relevant applications. The heuristic relevance ranking engine 114 may also use the data flow graph 432 and control flow graph 433 to determine the application heuristic relevance ranking 216 and API call heuristic relevance ranking 218, and visually describe the relationships between the relevant application logic 414, the relevant API call logic-1 422, and the relevant API call logic-2 424, discussed in further detail below.

The relevant API call logic-1 422 and the relevant API call logic-2 424 may be user selectable (indicated by the arrow 442), and provide the user the ability to generate a new application 440 with the selected logic. To that end, the EPAD project area 400 may implement point-and-click, drag-and-drop functionality for a user to select relevant API call logic-1 422 and relevant API call logic-2 424 to generate the new application 440. The EPAD project area 400 may also build the new application 440 by combining user selectable other relevant application logic 436, relevant API call logic-1, and relevant API call logic-2. The application creation display area 410 may also identify requirements 444 for the high-level processing concept represented by the original query 202. For example, a developer may desire to identify and confirm the requirements 444 for implementing a high-level processing concept (e.g., "send secure XML"). In one implementation, Exemplar may generate requirements documentation and end user documentation based on the help content 106 related to the other relevant application logic 436, the relevant API call logic-1, and the relevant API call logic-2 used to build the new application 440, and identify the requirements 444 in support of the new application 440.

Figure 5:
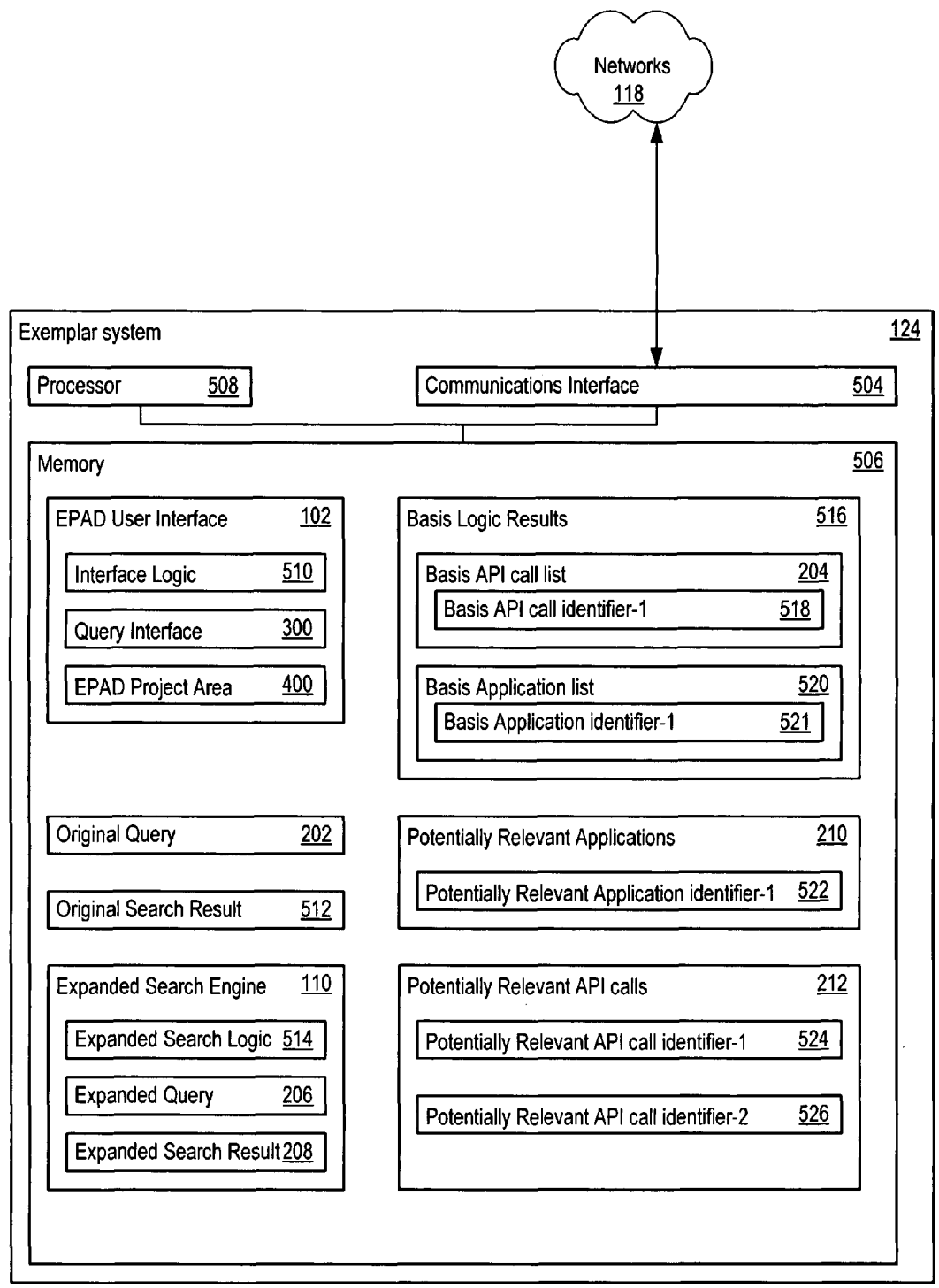
FIG. 5 shows a more detailed view of the Exemplar system.

FIG. 5 shows a more detailed view of the Exemplar system 124. The Exemplar system 124 may include a communications interface 504 used to communicate with various resources internal and external to Exemplar system 124, memory 506, and a processor 508. The processor 508 may execute any of the logic described below. The memory 506 may include the EPAD user interface 102 that employs the interface logic 510 to generate the Exemplar query interface 300, and the EPAD project area 400. The interface logic 510 may include graphics libraries, window rendering calls, and other user interface logic operable to display interface elements, receive input, and pass the input to any particular program logic in the Exemplar system 124.

The memory 506 may also include expanded search logic 514. Table 5, above, shows an expanded query 206 where the search logic 514 forms the expanded query by combining the original query 202 and the basis API call list 204 to form the expanded query 206. More generally, the expanded search logic 514 combines the original query 202 and the basis logic results 516 to form the expanded query 206, and executes an expanded search using the expanded query 206. The basis logic results 516 may include the basis API call list 204, including zero or more basis API call identifiers (e.g., the basis API call identifier-1 518), and a basis application list 520, including zero or more basis application identifiers (e.g., the basis application identifier-1 521). The expanded search logic 514 thereby obtains the expanded search results 208. The expanded search result 208 may include potentially relevant applications 210, and potentially relevant API calls 212 that include zero or more potentially relevant application identifiers-1 522 and zero or more potentially relevant API call identifiers (e.g., potentially relevant API call identifier-1 524 and potentially relevant API call identifier-2 526).

Figure 6:
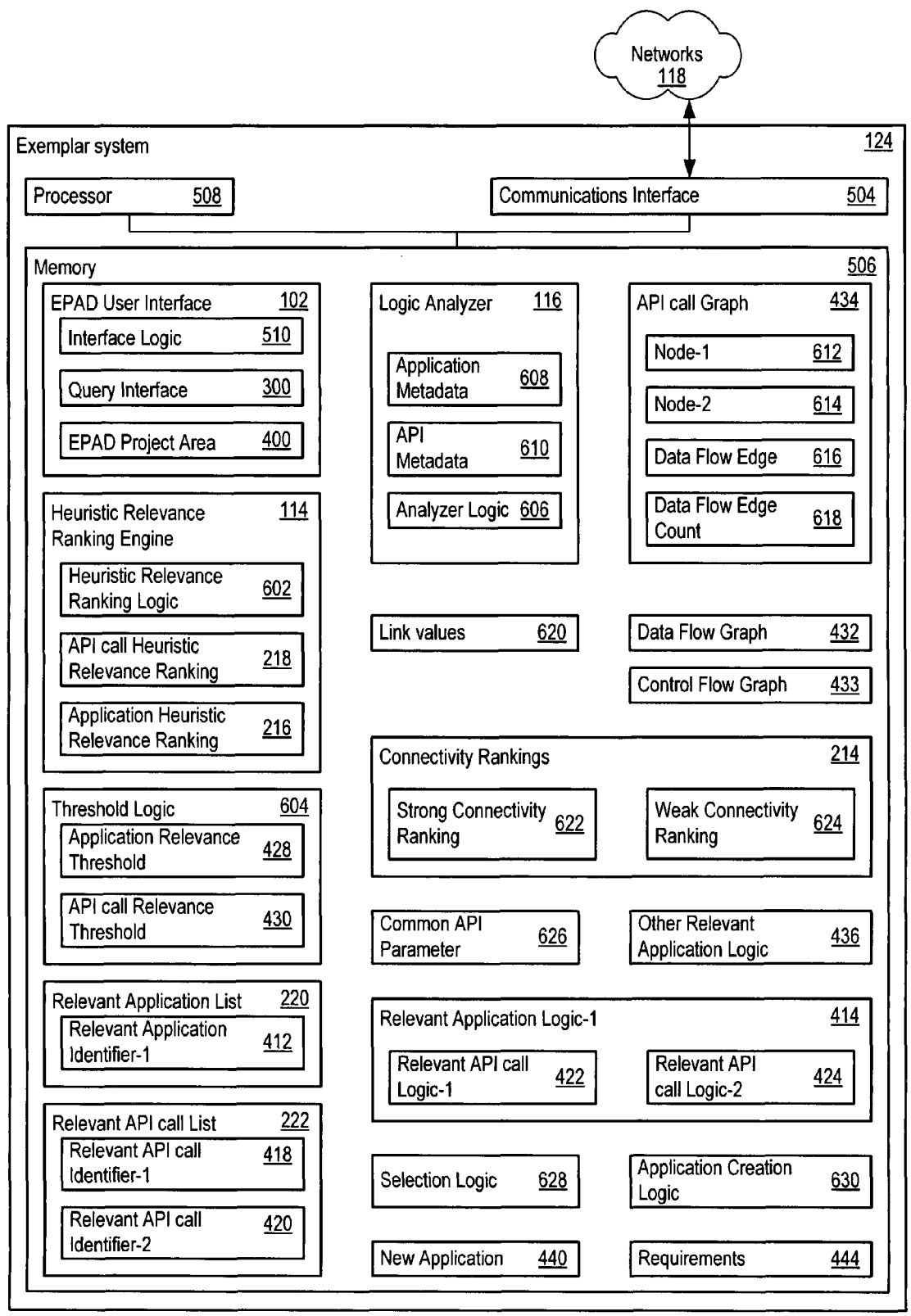
FIG. 6 shows other features of the Exemplar system.

FIG. 6 shows other features of the Exemplar system 124. The memory 506 may also include the heuristic relevance ranking engine 114 with the heuristic relevance ranking logic 602 that generates the application heuristic relevance ranking 216 and API call heuristic relevance ranking 218. The threshold logic 604 may apply the application relevance threshold 428 and API call relevance threshold 430 to the application heuristic relevance rankings 216 and API call heuristic relevance rankings 218 to determine whether potentially relevant applications 210 and potentially relevant API calls 212 qualify for inclusion in the relevant applications list 220 and the relevant API calls list 222. In other words, the threshold logic 604 may implement comparison logic to determine when potentially relevant logic qualifies as relevant logic.

The memory 506 may also include analyzer logic 606 that the processor 508 executes to identify application metadata 608 and API metadata 610 of the potentially relevant applications 210, and the potentially relevant API calls 212, respectively. Examples of application metadata 608 include application descriptions, application logic comments, application parameter names, and application parameter types of existing applications. Similarly, examples of API metadata 610 include API descriptions, API logic comments, API parameter names, and API parameter types.

Figure 7:
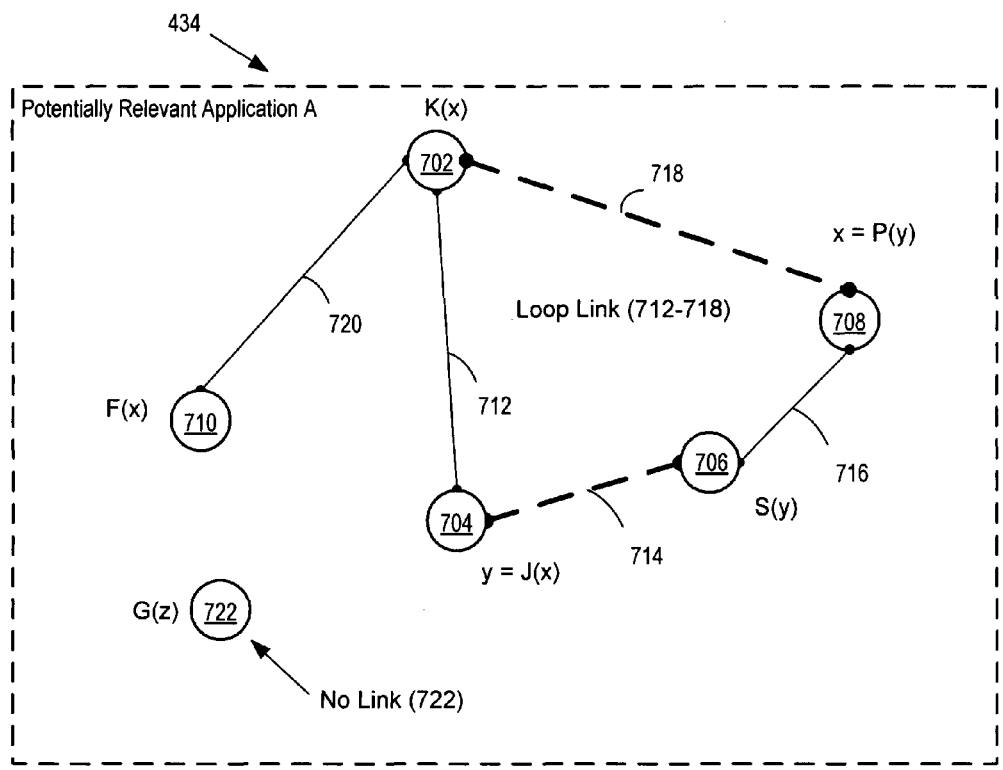
FIG. 7 shows API graphs for two different potentially relevant applications.
Figure 7:
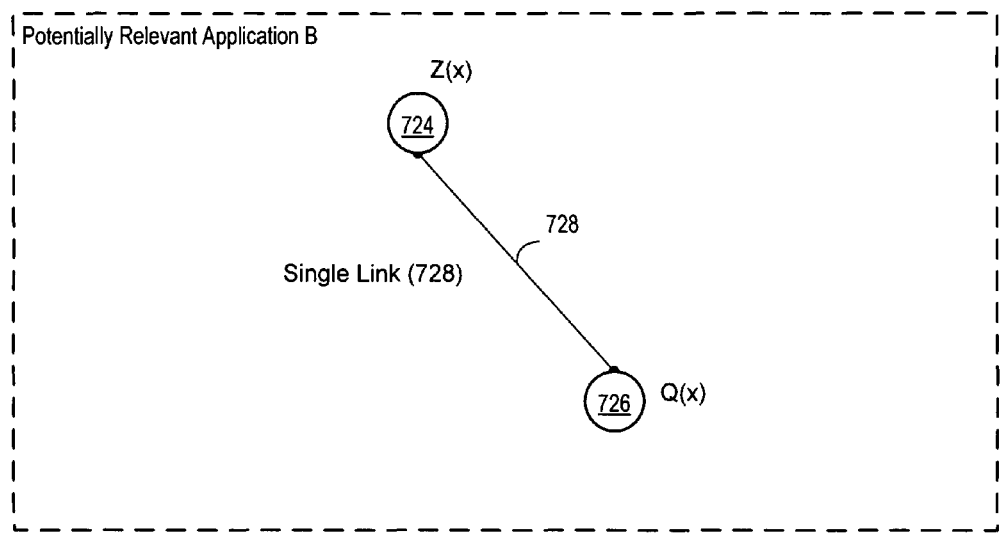

The analyzer logic 606 may generate the data flow graph 432 and control flow graph 433 to obtain the API call graph 434. The API call graph 434 may include nodes (e.g., node-1 612 and node-2 614) that represent potentially relevant API calls 212 and data flow edges (e.g., data flow edge 616) between the potentially relevant API calls 212 to indicate data flow. FIG. 7 provides additional examples. The analyzer logic 606 may determine the data flow edge count 618 corresponding to the number of connections between potentially relevant API calls 212 within the potentially relevant application 210. A graph with 'n' nodes has as many as n(n−1) edges between nodes. The data flow edge count 618 provides insight into the degree of connectedness for the data flow graph 432. The analyzer logic 606 may also assign link values 620 to the edges between nodes, discussed in detail below. In one implementation, the analyzer logic 606 may determine the connectivity rankings 214 (e.g., strong connectivity ranking 622 and weak connectivity ranking 624) for each connection between the potentially relevant API calls 212 based on common API parameters 626, discussed in detail below.

FIG. 6 further illustrates that memory 506 may include selection logic 628 and application creation logic 630. The processor 508 may execute the selection logic 628 to allow a user to select relevant application logic 414, and relevant API call logic (e.g., the relevant API call logic-1 422 and the relevant API call logic-2 424) to develop the new application 440. In another implementation, selection logic 628 may provide a user drag-and-drop point-and-click functionality to select other relevant application logic 436 to combine with the relevant API call logic-1 422, and the relevant API call logic-2 424 to build the new application 440. The processor 508 may execute the application creation logic 630 to identify requirements 444 for the high-level processing concept represented by the original query 202 by identifying the help content 106 used to obtain the basis logic results 516 corresponding to the user selected other relevant application logic 436, relevant application logic 414, relevant API call logic-1 422, and relevant API call logic-2 424. In one implementation, the application creation logic may form a query using the other relevant application logic 436, relevant application logic 414, relevant API call logic-1 422, and relevant API call logic-2 424 to obtain the help content 106 that describes the requirements 444. The application creation logic 630 may generate customized requirements documents from the help content 106 corresponding to the user selected other relevant application logic 436, relevant application logic 414, relevant API call logic-1 422, and relevant API call logic-2 424.

FIG. 7 shows API call graphs 434 for two different potentially relevant applications (e.g., a potentially relevant application A and potentially relevant application B). The heuristic relevance ranking engine 114 may assign a higher heuristic relevance ranking 216 to the potentially relevant application A than the potentially relevant application B based on the number of potentially relevant API calls 212, the connectivity rankings 214 and link values 620 assigned to each connection between potentially relevant API calls 212 included in the potentially relevant application A and potentially relevant application B, respectively.

In one implementation, the logic analyzer 116 produces the API call graphs 434. The logic analyzer 116 may identify the application metadata 608 and API metadata 610 of the potentially relevant applications 210, and the potentially relevant API calls 212, respectively, to analyze the data flow paths and connectivity between the potentially relevant API calls 212. The logic analyzer 116 may provide the application metadata 608 and API metadata 610 to the heuristic relevance ranking engine 114. In an alternative implementation, the heuristic relevance ranking engine 114 may identify application metadata 608 and API metadata 610, and produce the data flow graph 432 and control flow graph 433 using logic analysis formulas, rules and equations to obtain the API call graphs 434. The data flow graphs 432, control flow graphs 433 and API call graphs 434 may be represented as mathematical structures. The logic analyzer 116 may obtain the API call graphs 434 as a result of comparing data flow and control flow between potentially relevant API calls 212.

In one implementation, the logic analyzer 116 may perform control flow analysis on the potentially relevant application 210 to obtain control flow graphs 433, and perform data flow analysis on the control flow graphs 433 to obtain data flow graphs. The data flow graphs 432, control flow graphs 433, and API call graphs may similarly include nodes and edges. The logic analyzer 116 may obtain a control flow graph 433 by logically partitioning a potentially relevant application 210 as a result of parsing the logic of the potentially relevant application 210 into nodes that represent logic that includes API calls. The logic analyzer 116 may assign parsed logic of the potentially relevant application 210 to an assigned node until the logic analyzer 116 identifies a potentially relevant API call or branching logic (e.g., if-then, switch-case, and do-while), and add the assigned node to the control flow graph 433. Where a program includes multiple potentially relevant applications 210, the logic analyzer 116 may merge the control flow graphs 433 produced for each potentially relevant application into a single control flow graph 433. The logic analyzer 116 may obtain the API call graph 434 by comparing the edges in the control flow graphs 433 with the edges in the data flow graph 432. For example, where a control flow graph 433 includes an edge that a data flow graph 432 does not include, the logic analyzer 116 may not include the edge in the corresponding API call graph 434. However, where a control flow graph 433 includes an edge that the data flow graph 432 also includes, the logic analyzer 116 may include the edge in the API call graph 434.

In one implementation, the logic analyzer 116 may receive user input to determine particular dependencies between API calls. For example, where a potentially relevant application 210 uses a function pointer (e.g., a type of pointer used in C, and C++ languages) to reference a potentially relevant API call 212 and a hash table (e.g., a data structure that associates keys with values) to store an object that represents a data element passed between API calls, the logic analyzer 116 may receive user input to determine dependencies between API calls because the logic analyzer 116 may otherwise interpret multiple possible dependencies between API calls when in fact only one or a finite set of valid dependencies exists.

In another implementation, the logic analyzer 116 may analyze the data flow paths (e.g., edges between nodes discussed below) (e.g., link heuristics) of the potentially relevant applications 210, and potentially relevant API call logic 212 to determine the connectivity rankings 214 of each connection between potentially relevant API calls 212. In one implementation, the heuristic relevance ranking engine 114 may determine the application heuristic relevance ranking 216 for the potentially relevant application 210, shown in FIG. 7 as potentially relevant application A, based on the total number of API calls 'n' represented by nodes 712-720 that represent different potentially relevant API calls 212 found in the potentially relevant application 210, the total number of connections between the potentially relevant API calls 212 (e.g., edges 712-720) equal to n(n−1) (e.g., data flow edge count 614), the quality of the connections (e.g., strong connectivity or weak connectivity), and the type of link (e.g., loop link, single link, or no link) between the potentially relevant API calls 212.

The applications metadata 608 and API metadata 610 may describe the data flow paths between the different potentially relevant API calls 212 (e.g., nodes 702-710) within the potentially relevant application 210. For example, the logic analyzer 116 may determine common API parameters 626 and logic branches (e.g., if-then-else) found within the potentially relevant application 210 and potentially relevant API calls 212 to generate the data flow graphs 432, control flow graphs 433 and API call graphs 434. The logic analyzer 116 may, as FIG. 7 also illustrates, identify the function (e.g., K(x), J(x), S(y), P(y), F(x), and G(z)) of each potentially relevant API call 212 (e.g., 702-710, and 722) to determine the connectivity rankings 214.

In one implementation, the logic analyzer 116 may assign a weight $W_i$ (e.g., connectivity ranking 214) to each connection between the potentially relevant API calls 212 (e.g., nodes 712-720). The logic analyzer 116 may assign weak connections a weight of 0.5 and strong connections a weight of 1.0 depending on multiple factors. For example, edge 712, edge 716 and edge 720 may represent weak connections between potentially relevant API calls 212 represented by node pairs 702 and 710, 702 and 704, and 706 and 708 (e.g., function pairs K(x) and F(x), K(x) and J(x), and S(y) and P(y), respectively). Following the above example, where functions K(x) and F(x) share a common API parameter 626, but neither function generates the value of the common API parameter 626 then the logic analyzer 116 may assign the connectivity ranking 214 between node pair 702 and 710, represented by edge 720, a weak connection weight of 0.5. A weak connection assigned to a node pair (e.g., 702 and 710) may indicate a low relative probability (e.g., in comparison to the connectivity rankings of other node pairs) that the node pair implements the high-level processing concept represented by the original query 202. The logic analyzer 116 may use other heuristic analysis methods and tools to determine whether to assign a weak connection to a connectivity ranking 214.

Alternatively, edge 714, and edge 718 may represent strong connections between potentially relevant API calls 212, represented by node pairs 702 and 708, and 704 and 706 (e.g., function pairs K(x) and P(y), and J(x) and S(y), respectively). The logic analyzer 116 may determine that where function J(x) produces variable y, which both J(x) and S(y) share then the node pair 704 and 706, represented by edge 714, may be assigned a strong connectivity ranking 622. A strong connection assigned to a node pair (e.g., 704 and 706) may indicate a high relative probability (e.g., in comparison to the connectivity rankings of other node pairs) that the node pair implements the high-level processing concept represented by the original query 202. The logic analyzer 116 may use other heuristic analysis methods and tools to determine whether to assign a strong connection to a connectivity ranking 214.

The logic analyzer 116 may also assign a link value L (e.g. link value 620) to each connection between potentially relevant API calls 212. For example, Exemplar system 124 may assign a link value L equal to 1 where a loop link (e.g., edges 712-718 form a loop) exists between potentially relevant API calls 212 (e.g., nodes 702-708). Exemplar system 124 may assign a link value L equal to 0.5 where a single link (e.g., edge 720) exists between potentially relevant API calls 212 (e.g., nodes 702-708). In another implementation, Exemplar system 124 may assign a link value L equal to 0 where no link exists between potentially relevant API calls 212 (e.g., node 722 represents a potentially relevant API call 212 that does not have a connection with other potentially relevant API calls in a potentially relevant application 210). Additional, different, or fewer weights may be used. The heuristic relevance ranking engine 114 may use the connectivity rankings 214 and link values 620 assigned to each connection between potentially relevant API calls 212 to determine the application heuristic relevance ranking 216 according to:

$$\sum_{i=1}^{n(n-1)} \frac{W_i L_i}{n(n-1)} \text{ where } i \text{ ranges from 1 to } n(n-1). \quad \text{(Equation 1)}$$

The logic analyzer 116 may determine an API call heuristic relevance ranking 218 for a potentially relevant API call 212 based on the connectivity ranking 214 and link value 620 assigned to each edge that includes the potentially relevant API call 212. For example, where m represents the number of node pair including a particular node (e.g., 702 and 704, 702 and 708, and 702 and 710) and the number of edges (e.g., 712, 718 and 720) that include the node equals m(m−1), and the assigned value for each connectivity ranking 214 and link value 620 for each edge that includes the node represent W and L, respectively, the API call heuristic relevance ranking 218 for the node may be determined according to Equation 1 above where m substitutes for n:

$$\sum_{j=1}^{m(m-1)} \frac{W_j L_j}{m(m-1)} \text{ where } j \text{ ranges from 1 to } m(m-1).$$

Figure 8:
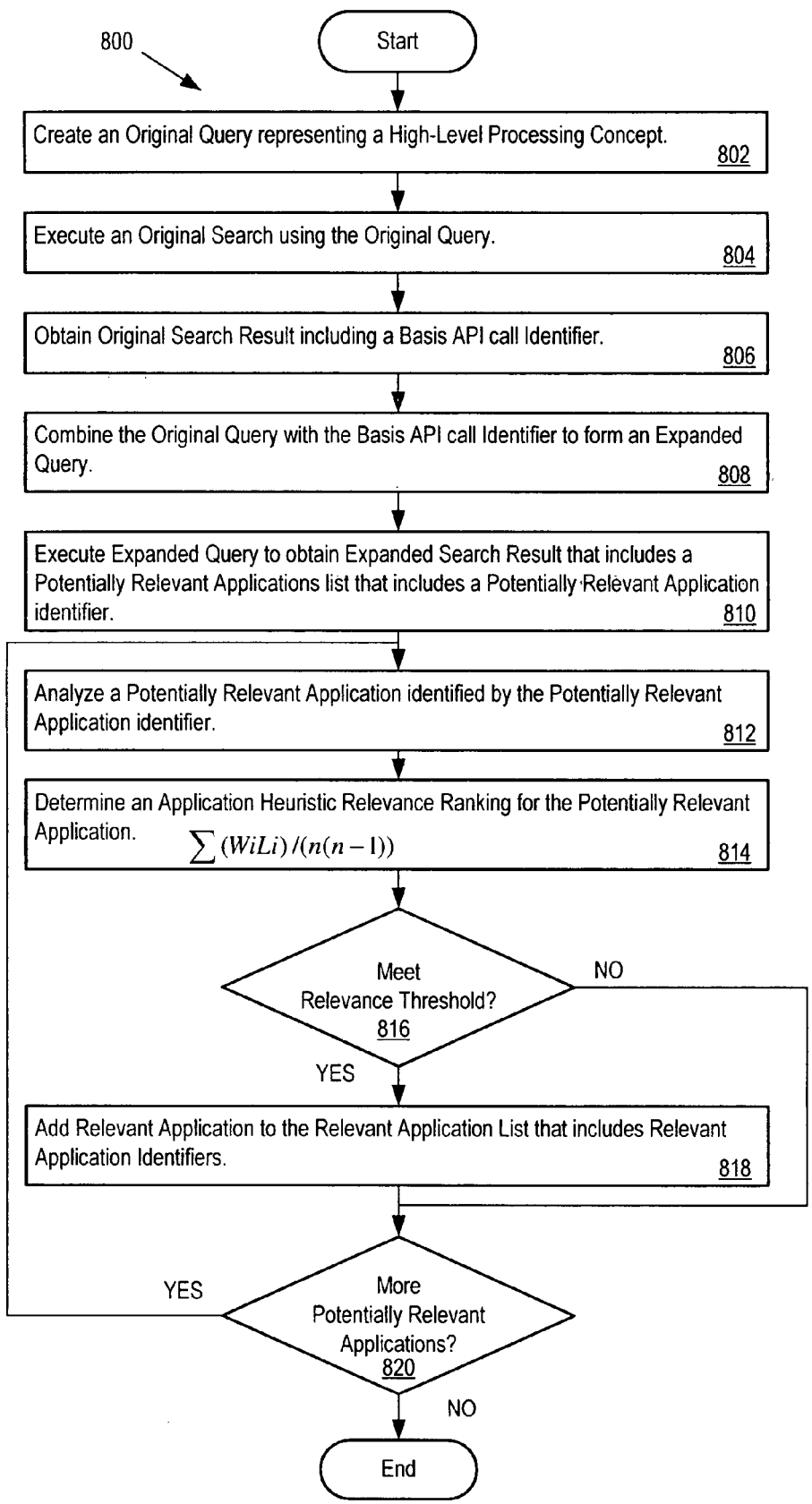
FIG. 8 shows the acts that the Exemplar system may take to obtain a relevant application list.

FIG. 8 shows the acts that the Exemplar system 124 may take to obtain a relevant application list 210. The Exemplar system 124 may use the interface logic 510 to receive an original query 202 representing a high-level processing concept (e.g., "send secure XML") (802). The help content processor 104 may execute an original search using the original query 202 (804) to obtain an original search result that includes basis logic results 516 (e.g., basis API call list 204 or basis application list 520). The basis logic results 516 may include a basis logic (e.g., API call) identifier (806). The Exemplar system 124 may combine the original query 202 with any part of the basis logic list to form an expanded query (808). The expanded search logic 514 may execute the expanded query 206 to obtain an expanded search result 208 that includes a potentially relevant applications 210 list and potentially relevant API calls 212 list (810). The potentially relevant logic list may identify potentially relevant logic. The analyzer logic 606 may analyze the potentially relevant logic identified by the potentially relevant application identifiers with respect to the logic repository 112 (812). The heuristic relevance ranking logic 602 may use the connectivity rankings 214, and link values 620 to determine the application heuristic relevance rankings 216 and API call heuristic relevance rankings 218 for the potentially relevant applications 210 and potentially relevant API calls 212 using Equation 1 or another formulation (814). The heuristic relevance ranking logic 602 may apply the application relevance threshold 428 and the API call relevance threshold 430 using the threshold logic 604 to determine whether the potentially relevant applications 210 and the potentially relevant API calls meet the application relevance threshold 428, and API call relevance threshold 430, respectively (816). The heuristic relevance ranking logic 602 may add the potentially relevant application 210 to the relevant application list 220 where the potentially relevant application 210 meets the application relevance threshold 428 (818). The heuristic relevance ranking logic 602 may determine the application heuristic relevance ranking 216 and API call heuristic relevance ranking 218 for each potentially relevant application 210 and potentially relevant API call 212 included the expanded search result 208 (820).

Figure 9:
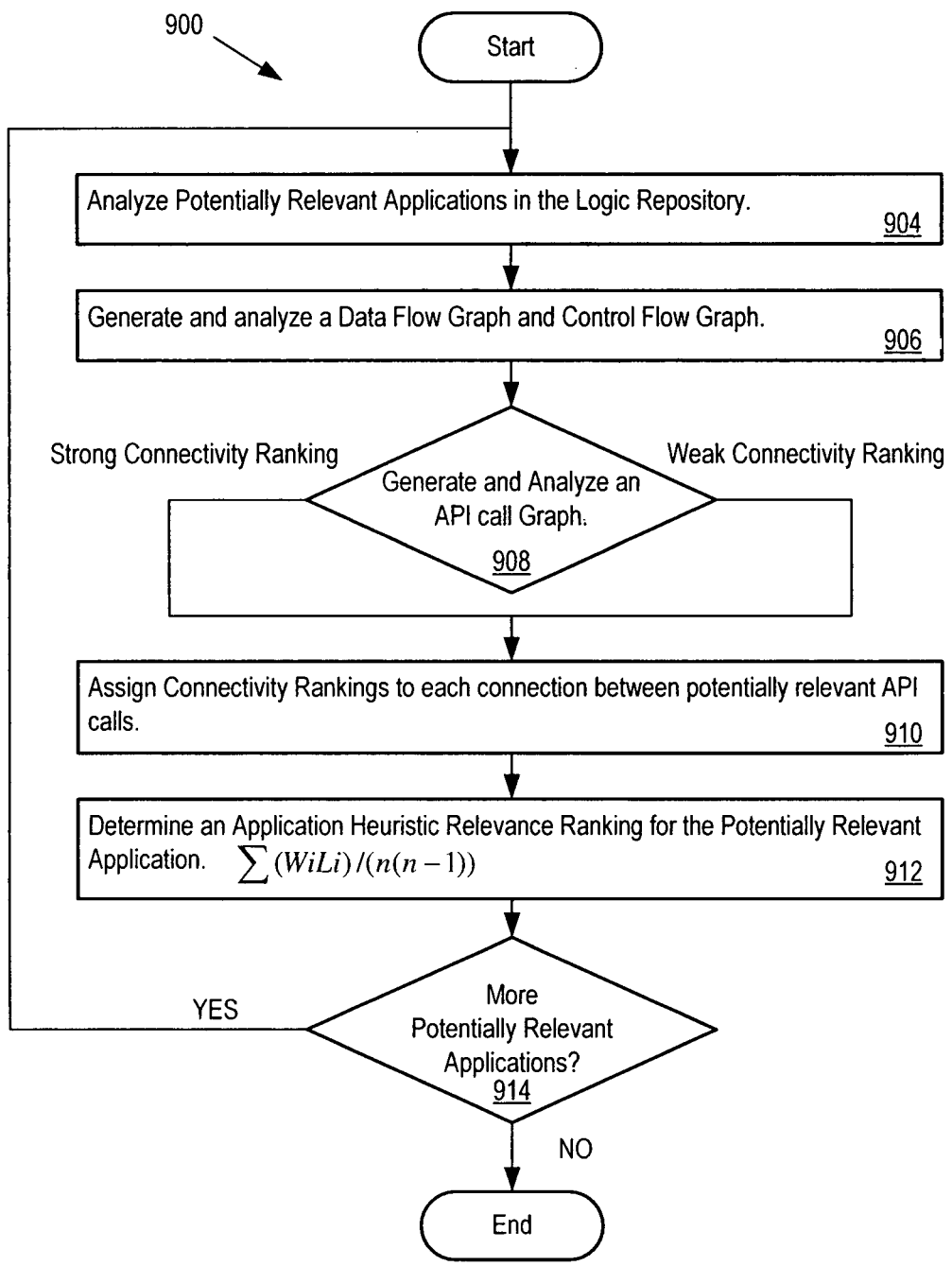
FIG. 9 shows the acts that the Exemplar system heuristic ranking engine may take to assign an application heuristic relevance ranking to a potentially relevant application.

FIG. 9 shows the acts that the Exemplar system 124 heuristic ranking engine 114 may take to assign an application heuristic relevance ranking 216 to a potentially relevant application 210. The analyzer logic 602 may analyze the potentially relevant application 210 and potentially relevant API calls 212 found in the logic repository (904). The analyzer logic 602 may generate and analyze a data flow graph 432 and control flow graph 433 (906) used to generate and analyze an API call graph 43 (908). The analyzer logic 602 may use the data flow graph 432, control flow graph 433, and API call graph to determine the link values 650 for the potentially relevant API calls included in a potentially relevant application 210 and assign a connectivity ranking 214 to each connection between potentially relevant API calls 212 (910). The heuristic relevance ranking logic 602 may determine an application heuristic relevance ranking 216 for each of the potentially relevant applications 210 (912) (e.g., the application heuristic relevance ranking 216 and an API call heuristic relevance ranking 218 may be determined according to Equation 1, as discussed above). The heuristic relevance ranking logic 602 may determine the application heuristic relevance ranking 216 and API call heuristic relevance ranking 218 for each potentially relevant application 210 and potentially relevant API call 212 included the expanded search result 208 (914).

Figure 10:
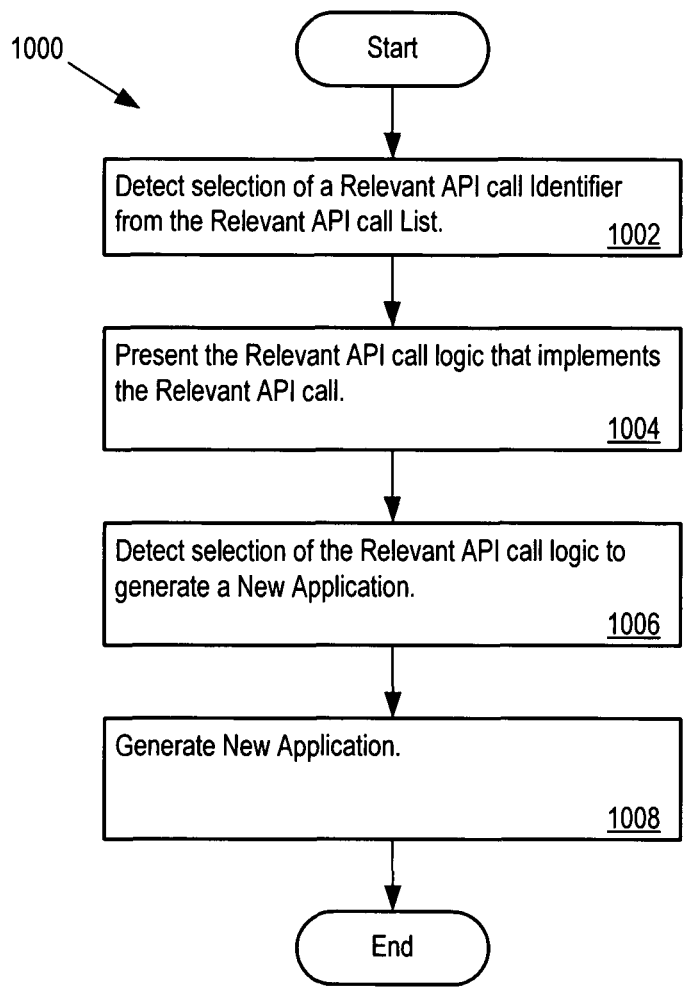
FIG. 10 shows the processing that the selection logic and application creation logic may take to generate a new application.

FIG. 10 shows the processing that the selection logic and application creation logic may take to generate a new application 440. EPAD project area 400 may use the selection logic 624 to detect selection of a relevant API call Identifier (e.g., as indicated by arrows 426 drawn from the relevant API call identifier-1 418 and the relevant API call identifier-2 420 to the relevant API call logic-1 422 and the relevant API call logic-2 424) from the relevant API call list 222 (1002). The EPAD project area 400 may present the relevant API call logic (e.g., the relevant API call logic-1 422 and the relevant API call logic-2 424) that implements the relevant API calls (1004). The EPAD project area may use the selection logic 624 to detect selection of the relevant API call logic (e.g., the relevant API call logic-1 422 and the relevant API call logic-2 424) and the other relevant application logic 436 to generate a new application 440 (1006). The EPAD project area may provide an option to generate the new application 440, using the application creation logic 626, following selection of the relevant API call logic (e.g., the relevant API call logic-1 422 and the relevant API call logic-2 424) and the other relevant application logic 436 to generate a new application 440 (1008). Exemplar system 124 may also identify requirements 444 for the high-level processing concept represented by the original query 202. In one implementation, Exemplar system 124 may generate requirements documentation and end user documentation based on the help content 106 related to the other relevant application logic 436, the relevant API call logic-1 422, and the relevant API call logic-2 424 combined to generate the new application 440 and identify the requirements 444.

The Exemplar system 124 greatly reduces the time, cost, and other resource expenditures associated with implementing a new application. The Exemplar system 124 produces relevant results starting with high-level processing concepts. A software developer may use the relevant applications to rapidly build new application prototypes.

A number of implementations have been described. Nevertheless, it will be understood that various modifications may be made without departing from the spirit and cope of the invention. Accordingly, other implementations are within the scope of the following claims.

What is claimed is:

1. A method comprising:
performing a first search using a first query against only help documentation that provides trusted descriptions of Application Programming Interface (API) calls;
accessing a first search result associated with the first search, the first search result comprising an API call identifier;
combining said first query with said API call identifier to form a second query; and
performing a second search using said second query to obtain a second search result comprising at least one application identifier of at least one application.

2. The method of claim 1 further comprising:
analyzing said at least one application to determine an application relevance ranking for said at least one application; and
ranking said at least one application with respect to at least one other application based on said application relevance ranking.

3. The method of claim 1 further comprising:
generating a list of applications including said at least one application identifier of said at least one application.

4. The method of claim 2 further comprising:
comparing said application relevance ranking to an application relevance threshold; and
if said application relevance ranking is greater than said application relevance threshold, adding said at least one application identifier of said at least one application to a list of applications.

5. The method of claim 1 further comprising:
detecting a selection of said at least one application identifier of said at least one application, wherein said at least one application identifier is displayed in a first region of a user interface; and
responsive to said selection, displaying code associated with said at least one application in a second region of said user interface.

6. The method of claim 1 further comprising:
detecting a selection of said at least one API call identifier, wherein said at least one API call identifier is displayed in a third region of a user interface; and
responsive to said selection, displaying code associated with said at least one API call identifier in a second region of said user interface.

7. The method of claim 2, wherein said analyzing further comprises determining said application relevance ranking based on at least one attribute associated with said at least one application.

8. The method of claim 7, wherein said at least one attribute is selected from a group consisting of: a number of nodes of an API call graph associated with said at least one application; a respective weight associated with each connection between a plurality of nodes of said API call graph; and a respective link value associated with each connection between a plurality of nodes of said API call graph.

9. The method of claim 1 further comprising:
accessing information associated with said at least one API call identifier, wherein said information is accessed from a source selected from a group consisting of a database, website, knowledge exchange and document repository, and
wherein said combining further comprises combining said first query with said at least one API call identifier and said information to form said second query.

10. A non-transitory computer-readable medium having computer-readable program code embodied therein for causing a computer system to perform a method comprising:
performing a first search using a first query against only help documentation that provides trusted descriptions of Application Programming Interface (API) calls;
accessing a first search result associated with the first search, the first search result comprising an API call identifier;
combining said first query with said API call identifier to form a second query; and
performing a second search using said second query to obtain a second search result comprising at least one application identifier of at least one application.

11. The computer-readable medium of claim 10, wherein said method further comprises:
analyzing said at least one application to determine an application relevance ranking for said at least one application; and
ranking said at least one application with respect to at least one other application based on said application relevance ranking.

12. The computer-readable medium of claim 10, wherein said method further comprises:
generating a list of applications including said at least one application identifier of said at least one application.

13. The computer-readable medium of claim 11, wherein said method further comprises:
comparing said application relevance ranking to an application relevance threshold; and
if said application relevance ranking is greater than said application relevance threshold, adding said at least one application identifier of said at least one application to a list of applications.

14. The computer-readable medium of claim 10, wherein said method further comprises:
detecting a selection of said at least one application identifier of said at least one application, wherein said at least one application identifier is displayed in a first region of a user interface; and
responsive to said selection, displaying code associated with said at least one application in a second region of said user interface.

15. The computer-readable medium of claim 10, wherein said method further comprises:
detecting a selection of said at least one API call identifier, wherein said at least one API call identifier is displayed in a third region of a user interface; and
responsive to said selection, displaying code associated with said at least one API call identifier in a second region of said user interface.

16. The computer-readable medium of claim 11, wherein said analyzing further comprises determining said application relevance ranking based on at least one attribute associated with said at least one application.

17. The computer-readable medium of claim 16, wherein said at least one attribute is selected from a group consisting of: a number of nodes of an API call graph associated with said at least one application; a respective weight associated with each connection between a plurality of nodes of said API call graph; and a respective link value associated with each connection between a plurality of nodes of said API call graph.

18. The computer-readable medium of claim 10, wherein said method further comprises:
accessing information associated with said at least one API call identifier, wherein said information is accessed from a source selected from a group consisting of a database, website, knowledge exchange and document repository, and
wherein said combining further comprises combining said first query with said at least one API call identifier and said information to form said second query.

19. A system comprising
a processor and a memory, wherein said memory comprises instructions that when executed by said processor implement a method comprising:
performing a first search using a first query against only help documentation that provides trusted descriptions of Application Programming Interface (API) calls;
accessing a first search result associated with the first search, the first search result comprising an API call identifier;
combining said first query with said API call identifier to form a second query; and
performing a second search using said second query to obtain a second search result comprising at least one application identifier of at least one application.

20. The system of claim 19, wherein said method further comprises:
   analyzing said at least one application to determine an application relevance ranking for said at least one application; and
   ranking said at least one application with respect to at least one other application based on said application relevance ranking.

21. The system of claim 19, wherein said method further comprises:
   generating a list of applications including said at least one application identifier of said at least one application.

22. The system of claim 20, wherein said method further comprises:
   comparing said application relevance ranking to an application relevance threshold; and
   if said application relevance ranking is greater than said application relevance threshold, adding said at least one application identifier of said at least one application to a list of applications.

23. The system of claim 19, wherein said method further comprises:
   detecting a selection of said at least one application identifier of said at least one application, wherein said at least one application identifier is displayed in a first region of a user interface; and
   responsive to said selection, displaying code associated with said at least one application in a second region of said user interface.

24. The system of claim 19, wherein said method further comprises:
   detecting a selection of said at least one API call identifier, wherein said at least one API call identifier is displayed in a third region of a user interface; and
   responsive to said selection, displaying code associated with said at least one API call identifier in a second region of said user interface.

25. The system of claim 20, wherein said analyzing further comprises determining said application relevance ranking based on at least one attribute associated with said at least one application.

26. The system of claim 25, wherein said at least one attribute is selected from a group consisting of: a number of nodes of an API call graph associated with said at least one application; a respective weight associated with each connection between a plurality of nodes of said API call graph; and a respective link value associated with each connection between a plurality of nodes of said API call graph.

27. The system of claim 19, wherein said method further comprises:
   accessing information associated with said at least one API call identifier, wherein said information is accessed from a source selected from a group consisting of a database, website, knowledge exchange and document repository, and
   wherein said combining further comprises combining said first query with said at least one API call identifier and said information to form said second query.

* * * * *